United States Patent
Herai et al.

(10) Patent No.: US 11,161,920 B2
(45) Date of Patent: Nov. 2, 2021

(54) METHOD FOR PRODUCING CARBOXYL-GROUP-CONTAINING NITRILE RUBBER

(71) Applicant: ZEON CORPORATION, Tokyo (JP)

(72) Inventors: Taiki Herai, Tokyo (JP); Tsutomu Yoshimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 273 days.

(21) Appl. No.: 16/495,003

(22) PCT Filed: Mar. 23, 2018

(86) PCT No.: PCT/JP2018/011681
§ 371 (c)(1),
(2) Date: Sep. 17, 2019

(87) PCT Pub. No.: WO2018/180978
PCT Pub. Date: Oct. 4, 2018

(65) Prior Publication Data
US 2020/0031955 A1    Jan. 30, 2020

(30) Foreign Application Priority Data

Mar. 28, 2017  (JP) .............................. JP2017-062684

(51) Int. Cl.
| | | |
|---|---|---|
| *C08C 1/15* | (2006.01) | |
| *C08J 3/24* | (2006.01) | |
| *C08L 9/04* | (2006.01) | |
| *C08C 19/04* | (2006.01) | |
| *C08F 236/12* | (2006.01) | |
| *C08C 19/02* | (2006.01) | |
| *C08F 6/22* | (2006.01) | |
| *C08J 3/16* | (2006.01) | |

(52) U.S. Cl.
CPC ................ *C08C 1/15* (2013.01); *C08C 19/02* (2013.01); *C08C 19/04* (2013.01); *C08F 6/22* (2013.01); *C08F 236/12* (2013.01); *C08J 3/16* (2013.01); *C08J 3/24* (2013.01); *C08L 9/04* (2013.01); *C08L 2312/00* (2013.01)

(58) Field of Classification Search
CPC . C08C 1/15; C08C 19/04; C08C 19/02; C08F 6/22; C08J 3/24; C08J 3/16; C08L 9/04; C08L 2312/00
See application file for complete search history.

(56) References Cited

U.S. PATENT DOCUMENTS

| | | | | |
|---|---|---|---|---|
| 3,542,705 A | * | 11/1970 | Mason | C08L 89/06 524/11 |
| 3,632,507 A | * | 1/1972 | Witt | C02F 1/54 210/735 |
| 4,920,176 A | * | 4/1990 | Jorgensen, Jr. | C08C 1/15 525/185 |

FOREIGN PATENT DOCUMENTS

| | | | |
|---|---|---|---|
| CN | 105418845 | * | 3/2016 |
| JP | 2004-285293 A | | 10/2004 |

OTHER PUBLICATIONS

Machine English translation of CN 105418845, Zhang et al., Mar. 2016.*
Jun. 26, 2018 Search Report issued in International Patent Application No. PCT/JP2018/011681.

* cited by examiner

Primary Examiner — Patrick D Niland
(74) Attorney, Agent, or Firm — Oliff PLC

(57) ABSTRACT

A method of producing a carboxyl group-containing nitrile rubber including a coagulation step of coagulating a carboxyl group-containing nitrile rubber component by mixing a monovalent metal salt and a polymer flocculating agent into a carboxyl group-containing nitrile rubber latex having an iodine value of 120 or less, wherein the monovalent metal salt is compounded in an amount of 3 to 25 parts by weight and the polymer flocculating agent is compounded in an amount of 0.01 to 10 parts by weight relative to 100 parts by weight of a rubber solid content in the latex, and a weight ratio of the monovalent metal salt/the polymer flocculating agent is in the range of 10 to 500

6 Claims, No Drawings

METHOD FOR PRODUCING CARBOXYL-GROUP-CONTAINING NITRILE RUBBER

TECHNICAL FIELD

The present invention relates to a method of producing a carboxyl group-containing nitrile rubber, and more particularly, to a method of producing a carboxyl group-containing nitrile rubber that can provide a crosslinked rubber product excellent in water resistance and permanent compression set resistance.

BACKGROUND ART

Since the past, a nitrile rubber (an acrylonitrile-butadiene copolymerized rubber) has been used as a material for rubber parts for automobiles such as hoses and tubes, making use of its oil resistance, mechanical properties, chemical resistance and the like. In addition, a hydrogenated nitrile rubber (a hydrogenated acrylonitrile-butadiene copolymerized rubber), which is obtained by hydrogenating carbon-carbon double bonds in the polymer backbone of a nitrile rubber, is further excellent in heat resistance, and thus, is being used for rubber parts such as seals, belts, hoses and diaphragms. In the meantime, in applications for seals, belts, rolls and the like, it has been demanded to further reduce permanent compression set.

For example, for such an attempt to reduce permanent compression set, Patent Document 1 proposes a technique of a carboxyl group-containing nitrile rubber formed by introducing carboxyl groups into a nitrile rubber. According to the technique of Patent Document 1, a crosslinked product of a carboxyl group-containing nitrile rubber of which permanent compression set is reduced to a certain degree is obtained: however, effects of reducing permanent compression set are not necessarily sufficient, and moreover, it cannot be said that water resistance is sufficient, either. Therefore, there have been some cases where such a crosslinked product is not suited for applications in which water resistance is demanded, such as applications as a sealing material for sealing up an aqueous refrigerant.

RELATED ART

Patent Document

Patent Document 1: Japanese Patent Laid-Open No. 2004-285293

SUMMARY OF THE INVENTION

Problem to be Solved by the Invention

The present invention has an object to provide a method of producing a carboxyl group-containing nitrile rubber that can provide a crosslinked rubber product excellent in water resistance and permanent compression set resistance.

Means for Solving the Problem

As a result of diligent researches in order to achieve the above-described object, the present inventors have found that the above-described object can be achieved by, upon coagulating a carboxyl group-containing nitrile rubber from a carboxyl group-containing nitrile rubber latex, mixing a monovalent metal salt and a polymer flocculating agent at a particular proportion to coagulate the carboxyl group-containing nitrile rubber, thereby leading to the completion of the present invention.

That is, according to the present invention, provided is a method of producing a carboxyl group-containing nitrile rubber, the method comprising a coagulation step of coagulating a carboxyl group-containing nitrile rubber component by mixing a monovalent metal salt and a polymer flocculating agent into a carboxyl group-containing nitrile rubber latex, wherein the monovalent metal salt is compounded in an amount of 3 to 25 parts by weight and the polymer flocculating agent is compounded in an amount of 0.01 to 10 parts by weight relative to 100 parts by weight of a rubber solid content in the latex, and a weight ratio of the monovalent metal salt/the polymer flocculating agent is in the range of 10 to 500.

In the production method according to the present invention, the polymer flocculating agent is preferably a cationic polymer flocculating agent.

In the production method according to the present invention, the polymer flocculating agent is preferably a condensate famed by co-condensating (A), (B) and/or (C) described below:

(A) at least one selected from alkylamines and alkanolamines, or a mixture of at least one selected from alkylamines and alkanolamines with ammonia;

(B) epihalohydrin; and (C) a compound represented by general formula (1) described below:

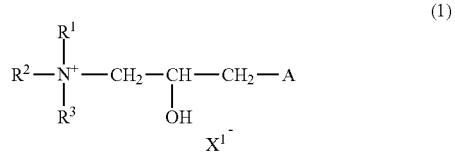

wherein $R^1$, $R^2$ and $R^3$ each independently denote a hydrogen atom, a lower alkyl group having 1 to 4 carbon atoms or a benzyl group, A denotes a halogen atom, and $X^{1-}$ denotes an arbitrary anion.

In the production method according to the present invention, the carboxyl group-containing nitrile rubber preferably contains an $\alpha,\beta$-ethylenically unsaturated carboxylate ester monomer unit.

In addition, according to the present invention, provided is a method of producing a crosslinkable rubber composition, the method comprising a step of compounding a crosslinking agent to a carboxyl group-containing nitrile rubber obtained through the above-described production method.

Furthermore, according to the present invention, provided is a method of producing a crosslinked rubber product, the method comprising a step of crosslinking a crosslinkable rubber composition obtained through the above-described production method.

Effects of Invention

According to the production method of the present invention, a carboxyl group-containing nitrile rubber that can provide a crosslinked rubber product excellent in water resistance and permanent compression set resistance can be provided.

DESCRIPTION OF EMBODIMENTS

<Carboxyl Group-Containing Nitrile Rubber Latex>

First of all, a carboxyl group-containing nitrile rubber latex used in the present invention will be described.

A carboxyl group-containing nitrile rubber constituting the carboxyl group-containing nitrile rubber latex used in the present invention is not particularly limited, and it may be any nitrile rubber that is obtained through emulsion polymerization of an α,β-ethylenically unsaturated nitrile monomer, a carboxyl group-containing monomer and another copolymerizable monomer added as needed and that contains unsubstituted (free) carboxy groups that have not been subjected to esterification or the like.

The α,β-ethylenically unsaturated nitrile monomer is not particularly limited as long as it is an α,β-ethylenically unsaturated compound having a nitrile group, and examples thereof include, for example, acrylonitrile; α-halogenoacrylonitriles such as α-chloroacrylonitrile and α-bromoacrylonitrile; and α-alkylacrylonitriles such as methacrylonitrile. Among these, acrylonitrile and methacrylonitrile are preferable, and acrylonitrile is more preferable. The α,β-ethylenically unsaturated nitrile monomer may be used singly, or a plurality of α,β-ethylenically unsaturated nitrile monomers may be used in combination.

The content of the α,β-ethylenically unsaturated nitrile monomer unit is preferably 10 to 60% by weight, more preferably 12 to 46% by weight, and further preferably 14 to 38% by weight relative to the entire monomer units. When the content of the α,β-ethylenically unsaturated nitrile monomer unit is in the above-described range, a crosslinked rubber product to be obtained will have excellent oil resistance and cold resistance.

The carboxyl group-containing monomer is not particularly limited as long as it is a monomer that can be copolymerized with the α,β-ethylenically unsaturated nitrile monomer and that has one or more unsubstituted (free) carboxy groups that have not been subjected to esterification or the like. By using the carboxyl group-containing monomer, carboxyl groups can be introduced into the nitrile rubber. And due to this, a crosslinked rubber product to be obtained will have satisfactory mechanical properties such as elongation while having excellent permanent compression set resistance.

Examples of the carboxyl group-containing monomer include, for example, α,β-ethylenically unsaturated monocarboxylic acid monomers, α,β-ethylenically unsaturated polyvalent carboxylic acid monomers, and α,β-ethylenically unsaturated dicarboxylate monoester monomers. In addition, examples of the carboxyl group-containing monomer also include monomers in which the carboxyl group in the above-described monomers forms a carboxylate salt. Furthermore, anhydrides of α,β-ethylenically unsaturated polyvalent carboxylic acids can also be used as the carboxyl group-containing monomer because they open up their acid anhydride groups after the copolymerization to form carboxyl groups.

Examples of the α,β-ethylenically unsaturated monocarboxylic acid monomer include acrylic acid, methacrylic acid, ethylacrylic acid, crotonic acid, cinnamic acid and the like.

Examples of the α,β-ethylenically unsaturated polyvalent carboxylic acid monomer include butenedioic acids such as fumaric acid and maleic acid, itaconic acid, citraconic acid, mesaconic acid, glutaconic acid, allylmalonic acid, teraconic acid and the like. In addition, examples of the anhydride of the α,β-unsaturated polyvalent carboxylic acid include maleic anhydride, itaconic anhydride, citraconic anhydride and the like.

Examples of the α,β-ethylenically unsaturated dicarboxylate monoester monomer include monoalkyl maleate esters such as monomethyl maleate, monoethyl maleate, monopropyl maleate and mono-n-butyl maleate; monocycloalkyl maleate esters such as monocyclopentyl maleate, monocyclohexyl maleate and monocycloheptyl maleate; monoalkylcycloalkyl maleate esters such as monomethylcyclopentyl maleate and monoethylcyclohexyl maleate; monoalkyl fumarate esters such as monomethyl fumarate, monoethyl fumarate, monopropyl fumarate and mono-n-butyl fumarate; monocycloalkyl fumarate esters such as monocyclopentyl fumarate, monocyclohexyl fumarate and monocycloheptyl fumarate; monoalkylcycloalkyl fumarate esters such as monomethylcyclopentyl fumarate and monoethylcyclohexyl fumarate; monoalkyl citraconate esters such as monomethyl citraconate, monoethyl citraconate, monopropyl citraconate and mono-n-butyl citraconate; monocycloalkyl citraconate esters such as monocyclopentyl citraconate, monocyclohexyl citraconate and monocycloheptyl citraconate; monoalkylcycloalkyl citraconate esters such as monomethylcyclopentyl citraconate and monoethylcyclohexyl citraconate; monoalkyl itaconate esters such as monomethyl itaconate, monoethyl itaconate, monopropyl itaconate and mono-n-butyl itaconate; monocycloalkyl itaconate esters such as monocyclopentyl itaconate, monocyclohexyl itaconate and monocycloheptyl itaconate; monoalkylcycloalkyl itaconate esters such as monomethylcyclopentyl itaconate and monoethylcyclohexyl itaconate and the like.

The carboxyl group-containing monomer may be used singly, or a plurality of carboxyl group-containing monomers may be used in combination. Among these, from the viewpoint of being capable of improving permanent compression set resistance more, α,β-ethylenically unsaturated dicarboxylate monoester monomers are preferable, monoalkyl maleate esters and monoalkyl fumarate esters are more preferable, monoalkyl maleate esters are further preferable, and mono-n-butyl maleate is particularly preferable. Note that the number of carbons in the alkyl group of the above-described alkyl esters is preferably 2 to 8.

The content of the carboxyl group-containing monomer unit is preferably 0.1 to 20% by weight, more preferably 0.2 to 15% by weight, and further preferably 0.5 to 10% by weight relative to the entire monomer units. When the content of the carboxyl group-containing monomer unit is in the above-described range, a crosslinked rubber product to be obtained will have properly enhanced permanent compression set resistance while properly suppressing reduction of processability upon compounding a crosslinking agent.

In addition, it is preferable that the carboxyl group-containing nitrile rubber constituting the carboxyl group-containing nitrile rubber latex used in the present invention also contain a conjugated diene monomer unit so that a crosslinked rubber product to be obtained has rubber elasticity.

As a conjugated diene monomer which forms the conjugated diene monomer unit, conjugated diene monomers having 4 to 6 carbon atoms such as 1,3-butadiene, isoprene, 2,3-dimethyl-1,3-butadiene, 1,3-pentadiene and chloroprene are preferable, 1,3-butadiene and isoprene are more preferable, and 1,3-butadiene is particularly preferable. The conjugated diene monomer may be used singly, or a plurality of conjugated diene monomers may be used in combination.

The content of the conjugated diene monomer unit (including a hydrogenated part as well) is preferably 20 to 89.9% by weight, more preferably 25 to 75% by weight, further preferably 30 to 65% by weight, and particularly preferably 30 to 60% by weight relative to the entire monomer units. When the content of the conjugated diene monomer unit is in the above-described range, a crosslinked rubber product to be obtained will have more properly enhanced rubber elasticity while making heat resistance and chemical stability satisfactory.

In addition, the carboxyl group-containing nitrile rubber constituting the carboxyl group-containing nitrile rubber latex used in the present invention may be formed by copolymerizing the α,β-ethylenically unsaturated nitrile monomer, the carboxyl group-containing monomer and the conjugated diene monomer along with another monomer that is copolymerizable with these monomers. Examples of such another monomer include ethylene, α-olefin monomers, aromatic vinyl monomers, α,β-ethylenically unsaturated carboxylate ester monomers (excluding those corresponding to the above-mentioned "carboxyl group-containing monomer"), fluorine-containing vinyl monomers, copolymerizable anti-aging agents and the like. Among these other monomers, by copolymerizing an α,β-ethylenically unsaturated carboxylate ester monomer, cold resistance is particularly improved.

As the α-olefin monomer, those having 3 to 12 carbon atoms are preferable, and examples thereof include, for example, propylene, 1-butene, 4-methyl-1-pentene, 1-hexene and 1-octene.

Examples of the aromatic vinyl monomer include, for example, styrene, α-methylstyrene and vinyl pyridine.

In addition, as described above, it is also preferable that the carboxyl group-containing nitrile rubber constituting the carboxyl group-containing nitrile rubber latex used in the present invention be famed by copolymerizing an α,β-ethylenically unsaturated carboxylate ester monomer (excluding those corresponding to the above-mentioned "carboxyl group-containing monomer") as another monomer so that cold resistance of the carboxyl group-containing nitrile rubber can be enhanced. Examples of the α,β-ethylenically unsaturated carboxylate ester monomer (excluding those corresponding to the above-mentioned "carboxyl group-containing monomer") include, for example, (meth)acrylate esters (abbreviation of "methacrylate esters and acrylate esters," the same hereinafter) having an alkyl group with 1 to 18 carbon atoms such as methyl acrylate, ethyl acrylate, n-butyl acrylate, n-dodecyl acrylate, methyl methacrylate and ethyl methacrylate; (meth)acrylate esters having an alkoxyalkyl group with 2 to 12 carbon atoms such as methoxymethyl acrylate, methoxyethyl acrylate and methoxyethyl methacrylate; (meth)acrylate esters having a cyanoalkyl group with 2 to 12 carbon atoms such as α-cyanoethyl acrylate, α-cyanoethyl methacrylate and α-cyanobutyl methacrylate; (meth)acrylate esters having a hydroxyalkyl group with 1 to 12 carbon atoms such as 2-hydroxyethyl acrylate, 2-hydroxypropyl acrylate and 2-hydroxyethyl methacrylate; (meth)acrylate esters having a fluoroalkyl group with 1 to 12 carbon atoms such as trifluoroethyl acrylate and tetrafluoropropyl methacrylate; α,β-ethylenically unsaturated dialkyl dicarboxylate esters such as dimethyl maleate, dimethyl fumarate, dimethyl itaconate and diethyl itaconate; and dialkylamino group-containing α,β-ethylenically unsaturated carboxylate esters such as dimethylaminomethyl acrylate and diethylaminoethyl acrylate. Among these α,β-ethylenically unsaturated carboxylate ester monomers, by copolymerizing a (meth)acrylate ester having an alkyl group with 1 to 18 carbon atoms, in particular, n-butyl acrylate, cold resistance is particularly improved.

Examples of the fluorine-containing vinyl monomer include, for example, fluoroethyl vinyl ether, fluoropropyl vinyl ether, o-trifluoromethylstyrene, vinyl pentafluorobenzoate, difluoroethylene and tetrafluoroethylene.

Examples of the copolymerizable anti-aging agent include, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline and N-phenyl-4-(4-vinylbenzyloxy) aniline.

With respect to these copolymerizable other monomers, a plurality of them may be used in combination. The content of units of such other monomers is preferably 50% by weight or less, more preferably 30% by weight or less, and further preferably 10% by weight or less relative to the entire monomer units.

When the carboxyl group-containing nitrile rubber used in the present invention contains an α,β-ethylenically unsaturated carboxylate ester monomer unit, the content ratio of the α,β-ethylenically unsaturated carboxylate ester monomer unit is preferably 1 to 50% by weight and more preferably 10 to 40% by weight relative to the entire monomer units.

The carboxyl group-containing nitrile rubber constituting the carboxyl group-containing nitrile rubber latex used in the present invention has an iodine value of preferably 120 or less, more preferably 60 or less, further preferably 40 or less, and particularly preferably 30 or less. When the iodine value is 120 or less, a crosslinked rubber product to be obtained will have improved heat resistance and ozone resistance.

The carboxyl group-containing nitrile rubber constituting the carboxyl group-containing nitrile rubber latex used in the present invention has a Mooney viscosity [ML1+4, 100° C.] of preferably 15 to 200, more preferably 30 to 100, and further preferably 45 to 90.

The content of carboxyl groups in the carboxyl group-containing nitrile rubber constituting the carboxyl group-containing nitrile rubber latex used in the present invention, that is, the molar number of carboxyl groups per 100 g of the carboxyl group-containing nitrile rubber is preferably $5 \times 10^{-4}$ to $5 \times 10^{-1}$ ephr, more preferably $1 \times 10^{-3}$ to $1 \times 10^{-1}$ ephr, and particularly preferably $5 \times 10^{-3}$ to $6 \times 10^{-2}$ ephr. When the content of carboxyl groups in the carboxyl group-containing nitrile rubber is too small, mechanical strength of a crosslinked rubber product to be obtained is liable to be reduced, and when it is too large, cold resistance can be reduced.

The carboxyl group-containing nitrile rubber latex used in the present invention can be prepared by copolymerizing the above-described monomers through emulsion polymerization method using, for example, a polymerization tank or the like.

Upon the polymerization through emulsion polymerization method, a usual method may be used, and secondary materials for polymerization that are usually used, such as an emulsifying agent, a polymerization initiator and a molecular weight modifier, can be used.

Examples of the emulsifying agent include, but are not particularly limited to, for example, nonionic emulsifying agents such as polyoxyethylene alkyl ethers, polyoxyethylene alkylphenol ethers, polyoxyethylene alkyl esters and polyoxyethylene sorbitan alkyl esters; anionic emulsifying agents such as salts of fatty acids such as myristic acid, palmitic acid, oleic acid and linoleic acid, alkylbenzenesulfonate salts such as sodium dodecylbenzenesulfonate, polycondensates of naphthalenesulfonate salts and formalin, higher alcohol sulfate ester salts, and alkylsulfosuccinate salts; and copolymerizable emulsifying agents such as sulfoesters of α,β-unsaturated carboxylic acids, sulfate esters of α,β-unsaturated carboxylic acids and sulfoalkyl aryl ethers. It is preferable that the emulsifying agent be used in an amount of 0.1 to 10 parts by weight relative to 100 parts by weight of the entire monomers.

The polymerization initiator is not particularly limited as long as it is a radical initiator, but examples thereof include inorganic peroxides such as potassium persulfate, sodium persulfate, ammonium persulfate, potassium perphosphate and hydrogen peroxide; organic peroxides such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide and t-butyl peroxyisobutyrate; and azo compounds such as azobisisobutyronitrile, azobis-2,4-dimethylvaleronitrile, azobiscyclohexanecarbonitrile and azobis(methyl isobutyrate) and the like. One of these polymerization initiators may be used singly, or two or more of them may be used in combination. As the polymerization initiator, inorganic or organic peroxides are preferable. When a peroxide is used as the polymerization initiator, it is also possible to combine that peroxide with a reducing agent such as sodium bisulfite or ferrous sulfate for use as a redox polymerization initiator. When a peroxide is used as the polymerization initiator, it is also possible to combine that peroxide with a reducing agent such as sodium bisulfite, ferrous sulfate, sodium formaldehydesulfoxylate or sodium iron ethylenediaminetetraacetate for use as a redox polymerization initiator. Furthermore, chelating agents such as sodium iron ethylenediaminetetraacetate tetrahydrate or builders such as sodium carbonate or sodium sulfate may also be used in combination. It is preferable that the polymerization initiator be used in an amount of 0.01 to 2 parts by weight relative to 100 parts by weight of the entire monomers.

Examples of the molecular weight modifier include, but are not particularly limited to, mercaptans such as t-dodecyl mercaptan, n-dodecyl mercaptan and octyl mercaptan; halogenated hydrocarbons such as carbon tetrachloride, methylene chloride and methylene bromide; α-methylstyrene dimer; and sulfur-containing compounds such as tetraethylthiuram disulfide, dipentamethylenethiuram disulfide and diisopropylxantogen disulfide and the like. One of these molecular weight modifiers may be used singly, or two or more of them may be used in combination. Among these, mercaptans are preferable and t-dodecyl mercaptan is more preferable. It is preferable that the molecular weight modifier be used in an amount of 0.1 to 0.8 parts by weight relative to 100 parts by weight of the entire monomers.

For a medium for the emulsion polymerization, water is usually used. The amount of water is preferably 80 to 500 parts by weight relative to 100 parts by weight of the entire monomers.

In addition, for a copolymer obtained through copolymerization, hydrogenation (hydrogenating reaction) of the copolymer may be carried out as needed. A method of hydrogenation in such a case is not particularly limited and any known methods may be employed.

<Method of Producing Carboxyl Group-Containing Nitrile Rubber>

Next, a method of producing a carboxyl group-containing nitrile rubber according to the present invention will be described.

The method of producing a carboxyl group-containing nitrile rubber according to the present invention comprises a coagulation step of coagulating a carboxyl group-containing nitrile rubber component by mixing a monovalent metal salt and a polymer flocculating agent into a carboxyl group-containing nitrile rubber latex, wherein the monovalent metal salt is compounded in an amount of 3 to 25 parts by weight and the polymer flocculating agent is compounded in an amount of 0.01 to 10 parts by weight relative to 100 parts by weight of a rubber solid content in the latex, and a weight ratio of the monovalent metal salt/the polymer flocculating agent is in the range of 10 to 500.

According to the production method of the present invention, a monovalent metal salt and a polymer flocculating agent are mixed into a carboxyl group-containing nitrile rubber latex at the above-described certain proportion, thereby coagulating a carboxyl group-containing nitrile rubber component, and due to this, a carboxyl group-containing nitrile rubber to be obtained can provide a crosslinked rubber product excellent in water resistance and permanent compression set resistance.

Due to their researches, the present inventors have obtained the following findings. That is, in order to improve water resistance, it is effective to reduce the amount of metals in a crosslinked rubber product that is to be finally obtained. Meanwhile, when a metal salt with a valence of two or more, which is highly coagulable, is used, it is possible to carry out coagulation with a relatively small amount. However, there is a problem that permanent compression set resistance of a crosslinked rubber product to be obtained would be insufficient. On the other hand, when a monovalent metal salt is used as a coagulating agent, reduction of permanent compression set resistance associated with the use of the monovalent metal salt does not occur. However, in order to carry out sufficient coagulation, it is required to use the metal salt in a relatively large amount. As a result, the amount of metals in a crosslinked rubber product that is to be finally obtained would be large as well, leading to poor water resistance.

Responding to this, the present inventors have conducted further examination, and have founded that, by using a polymer flocculating agent as a coagulating agent in combination with a monovalent metal salt, coagulation can be carried out satisfactorily even when the monovalent metal salt is used in a relatively small amount, and that use of a carboxyl group-containing nitrile rubber obtained as such can provide a crosslinked rubber product excellent in water resistance and permanent compression set resistance.

Examples of the monovalent metal salt include halides of a monovalent metal such as potassium chloride and sodium chloride; sulfate salts of a monovalent metal such as sodium sulfate and potassium sulfate; and carbonate salts of a monovalent metal such as potassium carbonate and sodium carbonate and the like. One of these monovalent metal salts may be used singly, or two or more of them may be used in combination.

The monovalent metal salt is used in an amount of 3 to 25 parts by weight, preferably 4 to 17 parts by weight, more preferably 5 to 15 parts by weight, and further preferably 5 to 12 parts by weight relative to 100 parts by weight of a rubber solid content contained in the carboxyl group-containing nitrile rubber latex. When the amount of the monovalent metal salt used is too small, coagulation would be insufficient, and on the other hand, when it is too large, water resistance of a crosslinked rubber product to be obtained would be reduced.

The polymer flocculating agent is not particularly limited as long as it is a polymeric compound having hydrophilic groups and hydrophobic groups, and may be any of anionic, cationic and nonionic polymer flocculating agents. However, from the viewpoint of being capable of further enhancing effects of the present invention, cationic polymer flocculating agents are preferable.

As the cationic polymer flocculating agent, polymer flocculating agents having cationic groups in their molecules, that is, polymer flocculating agents exhibiting cationic properties when they are dissolved in water may be used, such as polyamines, polydicyandiamides, cationized starches, cationic poly(meth)acrylamides, water soluble aniline resins, polythioureas, polyethyleneimines, quaternary ammonium salts, polyvinylpyridines and chitosans. However, from the viewpoint of being capable of further enhancing effects of the present invention, a condensate famed by co-condensating (A), (B) and/or (C) described below can be used suitably:
(A) at least one selected from alkylamines and alkanolamines, or a mixture of at least one selected from alkylamines and alkanolamines with ammonia;
(B) epihalohydrin; and
(C) a compound represented by general formula (1) described below:

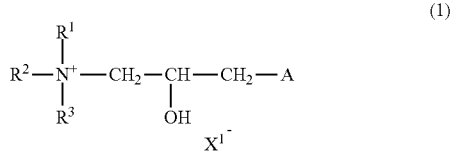

wherein $R^1$, $R^2$ and $R^3$ each independently denote a hydrogen atom, a lower alkyl group having 1 to 4 carbon atoms or a benzyl group, A denotes a halogen atom, and $X^{1-}$ denotes an arbitrary anion.

As the cationic polymer flocculating agent, from the viewpoint of further improvement in effects of the present invention, a condensate foamed by co-condensating (A) and (B) described above is preferable. Specific examples of the condensate famed by co-condensating (A) and (B) described above may include dimethylamine-epichlorohydrin condensates, diethylamine-epichlorohydrin condensates, ethylenediamine-epichlorohydrin condensates, dimethylamine-ammonia-epichlorohydrin polycondensates, dimethylamine-epichlorohydrin-chlorohydroxypropyltrimethylammonium chloride condensates, diethylamine-ethylaminoethanol-epichlorohydrin condensates, dimethylamine-epibromohydrin condensates, diethylamine-epibromohydrin condensates, diethylamine-isopropylamine-epibromohydrin condensates, dimethylamine-ethylaminoethanol-epichlorohydrin and the like. Among these, condensates including diethylamine and epichlorohydrin as structural units are more preferable, and dimethylamine-ammonia-epichlorohydrin polycondensates are particularly preferable.

Alternatively, as the cationic polymer flocculating agent, compounds other than condensates foamed by co-condensating (A), (B) and/or (C) described above may be used, such as dicyandiamide-diethylenetriamine polycondensates and dicyandiamide-formaldehyde polycondensates, dimethyldiallylammonium chloride polymers, dimethyldiallylammonium chloride-acrylamide copolymers, diallylamine hydrochloride-acrylamide copolymers, trimethylaminoethyl methacrylate methyl sulfate polymers, dimethylaminoethyl methacrylate sulfate polymers and diallylamine hydrochloride-acrylic acid-acrylamide copolymers. Among these, from the viewpoint of being capable of further enhancing effects of the present invention, dimethyldiallylammonium chloride polymers are preferable.

The molecular weight of the polymer flocculating agent is not particularly limited, but those having the weight average molecular weight (Mw) in the range of 1,000 to 1,000,000 are preferable, more preferably in the range of 2,000 to 500,000 and further preferably in the range of 2,000 to 100,000.

The polymer flocculating agent is used in an amount of 0.01 to 10 parts by weight, preferably 0.03 to 5 parts by weight, and more preferably 0.05 to 1 part by weight relative to 100 parts by weight of a rubber solid content in the carboxyl group-containing nitrile rubber latex. When the amount of the polymer flocculating agent used is too small, coagulation would be insufficient, and on the other hand, when it is too large, water resistance of a crosslinked rubber product to be obtained would be reduced.

Moreover, in the production method according to the present invention, the ratio of the amount of the monovalent metal salt used to the amount of the polymer flocculating agent used is 10 to 500, preferably 13 to 300, and more preferably 15 to 150 in the weight ratio of "the monovalent metal salt/the polymer flocculating agent." When the ratio of the amount of the monovalent metal salt used to the amount of the polymer flocculating agent used is out of the range described above, coagulation would be insufficient, or even when coagulation is achieved sufficiently, a crosslinked rubber product to be obtained would have poor water resistance.

In addition, an anti-aging agent may also be added to an oil layer or an aqueous layer before coagulation. Examples of the anti-aging agent that can be used include, but are not particularly limited to, 2,6-di-t-butyl-4-cresol (ANTAGE BHT, manufactured by Kawaguchi Chemical Industry Co., LTD.), 2,2'-methylenebis(4-methyl-6-tert-butylphenol) (Sandant 2246, manufactured by SANSHIN CHEMICAL INDUSTRY CO., LTD.), bis(3,5-di-tert-butyl-4-hydroxybenzyl)sulfide (Sandant 103, manufactured by SANSHIN CHEMICAL INDUSTRY CO., LTD.), pentaerythritol tetrakis[3-(3,5-di-tert-butyl-4-hydroxyphenyl)propionate] (Irganox 1010, manufactured by BASF Japan Ltd.), octadecyl 3-(3,5-di-tert-butyl-4-hydroxyphenyl)propionate (Irganox 1076, manufactured by BASF Japan Ltd.), isooctyl-3-(3,5-di-tert-butyl-4-hydroxyphenyl)propionate (Irganox 1135, manufactured by BASF Japan Ltd.), hexamethylene bis[3-(3,5-di-tert-butyl-4-hydroxyphenyl)propionate] (Irganox 259, manufactured by BASF Japan Ltd.), 4,6-bis(octylthiomethyl)-o-cresol (Irganox 1520L, manufactured by BASF Japan Ltd.) and the like According to the production method of the present invention, by using the monovalent metal salt and the polymer flocculating agent in combination, a carboxyl group-containing nitrile rubber to be obtained can provide a crosslinked rubber product excellent in water resistance and permanent compression set resistance. However, in addition to this, the production method of the present invention can make the average crumb diameter of crumbs salting out through the coagulation relatively small, that is, preferably 10 mm or less and more preferably 5 mm or less, in the weight average particle diameter. And due to this, the production method of the present invention can even shorten drying time after the coagulation. And as a result, the production method of the present invention can improve production efficiency of the carboxyl group-containing nitrile rubber. Furthermore, according to the production method of the present invention, the monovalent metal salt is used in a relatively small amount, as described above, and therefore, the proportion of the monovalent metal salt contained in water for salting out after the coagulation can be reduced. Due to this, treatment burdens associated with treatment of waste water generated by the coagulation can be mitigated. And as a result, metal salts can be retrieved readily from the waste water generated by the coagulation, and treatment burdens associated with the retrieval of metals salts can be mitigated.

In the production method according to the present invention, a method of mixing the carboxyl group-containing nitrile rubber latex with the monovalent metal salt and the polymer flocculating agent is not particularly limited, but examples thereof include, for example, a method in which the monovalent metal salt and the polymer flocculating agent are placed in a mixing instrument such as a mixing tank in advance, and while stirring, the carboxyl group-containing nitrile rubber latex is added thereto, or a method in which the carboxyl group-containing nitrile rubber latex is placed in a mixing instrument such as a mixing tank in advance, and while stirring, the monovalent metal salt and the polymer flocculating agent are added thereto. Alternatively, the method may be a method in which the carboxyl group-containing nitrile rubber latex is continuously fed to a coagulation instrument such as an extruder or a pump with a crushing function along with the monovalent metal salt and the polymer flocculating agent, thereby mixing them to coagulate the carboxyl group-containing nitrile rubber component, or the like. From the viewpoint where a crumb-like rubber is readily obtained, preferred is the method in which the monovalent metal salt and the polymer flocculating agent are placed in a mixing instrument such as a mixing tank in advance, and while stirring, the carboxyl group-containing nitrile rubber latex is added thereto.

In addition, in the production method according to the present invention, it is preferable that, after mixing the carboxyl group-containing nitrile rubber latex, the monovalent metal salt and the polymer flocculating agent, the mixed liquor thereof be subjected to stirring in order to promote coagulation of the carboxyl group-containing nitrile rubber component. Note that stirring of the mixed liquor may be carried out using a mixing instrument or a coagulation instrument used upon mixing the carboxyl group-containing nitrile rubber latex, the monovalent metal salt and the polymer flocculating agent, or may be carried out using a stirring instrument (for example, a stirring tank or the like) different from the mixing instrument or the coagulation instrument. The stirring time may be appropriately adjusted depending on the speed at which coagulation of the carboxyl group-containing nitrile rubber component advances, but it is preferably 1 to 20 minutes, more preferably 1 to 10 minutes, and further preferably 1 to 5 minutes. When the stirring time is in the range described above, coagulation of the carboxyl group-containing nitrile rubber component can be carried out properly while achieving satisfactory productivity.

In the production method according to the present invention, the temperature at which coagulation of the carboxyl group-containing nitrile rubber component is carried out, that is, the mixing temperature upon mixing the carboxyl group-containing nitrile rubber latex, the monovalent metal salt and the polymer flocculating agent is not particularly limited, but it is preferably in the range of 0 to 100° C. and more preferably in the range of 50 to 90° C. Coagulation of the carboxyl group-containing nitrile rubber component can be carried out properly while achieving satisfactory productivity.

Then, in the production method according to the present invention, a carboxy group-containing nitrile rubber after the coagulation obtained over the course of such a coagulation step is usually obtained in the form of a crumb slurry containing a crumb-like carboxyl group-containing nitrile rubber.

Subsequently, in the production method according to the present invention, the crumb slurry obtained as such is subjected to washing with water or the like as needed, and then, by separating moisture and the crumb-like carboxyl group-containing nitrile rubber, a crumb in the water-containing condition is obtained. Then, the crumb in the water-containing condition obtained as such is subjected to dehydration of the crumb in the water-containing condition by using a centrifuge, a screen such as a wire gauze, a squeezer or the like, and subjected to heating and drying under conditions of preferably 50 to 120° C., more preferably 70 to 100° C. and preferably 10 minutes to 2 hours, more preferably 30 minutes to 1 hour, using a band drier or the like. As a result, a crumb-like carboxyl group-containing nitrile rubber in the condition of substantially containing almost no water can be obtained. In addition, the drying conditions can be appropriately selected, and vacuum drying may be carried out at 40 to 80° C. for 1 to 15 hours, or heating and drying may be carried out under conditions of preferably 50 to 120° C., more preferably 70 to 100° C. and preferably 10 minutes to 2 hours, more preferably 30 minutes to 1 hour, using a drier with a ventilation function. In particular, the production method according to the present invention can make the average crumb diameter of crumbs obtained from the coagulation relatively small, as mentioned above, and therefore, even with drying for such a relatively short time, the crumb-like carboxyl group-containing nitrile rubber in the condition of substantially containing almost no water can be obtained.

Then, the crumb-like carboxyl group-containing nitrile rubber obtained as such is, for example, introduced into a baler and compressed to an appropriate size, and made into a product (bale).

The content of all metals and the content of metals with a valence of two or more in the carboxyl group-containing nitrile rubber obtained through the production method according to the present invention are not particularly limited, but from the viewpoint of providing a crosslinked rubber product to be obtained with further excellent water resistance and permanent compression set resistance, the content of all metals is preferably 5000 ppm by weight or less, more preferably 2500 ppm by weight or less, and further preferably 1000 ppm by weight or less, and the content of metals with a valence of two or more is preferably 400 ppm by weight or less, more preferably 300 ppm by weight or less, and further preferably 200 ppm by weight or less. Note that the lower limit of the content of all metals is not particularly limited, but it is preferably 10 ppm by weight or more, and similarly, the lower limit of the content of metals with a valence of two or more is not particularly limited, either, but it is preferably 10 ppm by weight or more.

<Crosslinkable Rubber Composition>

A crosslinkable rubber composition according to the present invention is a composition obtained by compounding a crosslinking agent into a carboxyl group-containing nitrile rubber obtained through the above-mentioned production method according to the present invention. The crosslinking agent is not particularly limited, and sulfur-based crosslinking agents, organic peroxide-based crosslinking agents, polyamine-based crosslinking agents and the like can be used. However, from the viewpoint of being capable of further enhancing permanent compression set resistance of a crosslinked rubber product to be obtained, polyamine-based crosslinking agents are preferable.

The polyamine-based crosslinking agent is not particularly limited as long as it is a compound having two or more amino groups, or one of those that will be in the form of a compound having two or more amino groups upon crosslinking. However, it is preferably a compound in which a plurality of hydrogen atoms of an aliphatic hydrocarbon or an aromatic hydrocarbon are substituted with amino groups or hydrazide structures (a structure represented by —$CONHNH_2$, where CO represents a carbonyl group), or one of those that will be in the form of such a compound upon crosslinking.

Specific examples of the polyamine-based crosslinking agent include aliphatic polyvalent amines such as hexamethylenediamine, hexamethylenediamine carbamate, N,N-dicinnamylidene-1,6-hexanediamine, tetramethylenepentamine and hexamethylenediamine cinnamaldehyde adducts; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine and 1,3,5-benzenetriamine; and polyvalent hydrazides such as dihydrazide isophthalate, dihydrazide terephthalate, dihydrazide phthalate, dihydrazide 2,6-naphthalenedicarboxylate, dihydrazide naphthalate, dihydrazide oxalate, dihydrazide malonate, dihydrazide succinate, dihydrazide glutamate, dihydrazide adipate, dihydrazide pimelate, dihydrazide suberate, dihydrazide azelate, dihydrazide sebacate, dihydrazide brassylate, dihydrazide dodecanedioate, dihydrazide acetonedicarboxylate, dihydrazide fumarate, dihydrazide maleate, dihydrazide itaconate, dihydrazide trimellitate, dihydrazide 1,3,5-benzenetricarboxylate, dihydrazide aconitate, dihydrazide pyromellitate and the like. Among these, from the viewpoint of being capable of making effects of the present invention even further remarkable, aliphatic polyvalent amines and aromatic polyvalent amines are preferable, hexamethylenediamine carbamate and 2,2-bis[4-(4-aminophenoxy)phenyl]propane are more preferable, and hexamethylenediamine carbamate is particularly preferable.

The content of the crosslinking agent in the crosslinkable rubber composition according to the present invention is not particularly limited, but it is preferably 0.1 to 10 parts by weight, and more preferably 0.2 to 5 parts by weight relative to 100 parts by weight of the carboxyl group-containing nitrile rubber.

In addition, when the polyamine-based crosslinking agent is used as the crosslinking agent, it is preferable that the crosslinkable rubber composition further contain a basic crosslinking accelerator.

Specific examples of the basic crosslinking accelerator include basic crosslinking accelerators having a cyclic amidine structure such as 1,8-diazabicyclo[5,4,0]undecene-7 (hereinafter, may be abbreviated as "DBU"), 1,5-diazabicyclo[4,3,0]nonene-5 (hereinafter, may be abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline and 1-ethoxymethyl-2-methylimidazoline; guanidine-based basic crosslinking accelerators such as tetramethylguanidine, tetraethylguanidine, diphenylguanidine, 1,3-di-ortho-tolylguanidine and orthotolylbiguanide; aldehydeamine-based basic crosslinking accelerators such as n-butylaldehydeaniline and acetaldehyde ammonia; dicycloalkylamines such as dicyclopentylamine, dicyclohexylamine and dicycloheptylamine; and secondary amine-based basic crosslinking accelerators such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine and di(3-chlorocyclopentyl)amine, and the like. Among these, guanidine-based basic crosslinking accelerators, secondary amine-based basic crosslinking accelerators and basic crosslinking accelerators having a cyclic amidine structure are preferable, basic crosslinking accelerators having a cyclic amidine structure are more preferable, 1,8-diazabicyclo[5,4,0]undecene-7 and 1,5-diazabicyclo[4,3,0]nonene-5 are further preferable, and 1,8-diazabicyclo[5,4,0]undecene-7 is particularly preferable. Note that the above-described basic crosslinking accelerators having a cyclic amidine structure may form a salt with an organic carboxylic acid, an alkylphosphoric acid or the like. In addition, the above-described secondary amine-based basic crosslinking accelerators may be mixed with an alcohol such as an alkylene glycol or an alkyl alcohol having 5 to 20 carbon atoms, and may further contain an inorganic acid and/or an organic acid. Then, the secondary amine-based basic crosslinking accelerators may form a salt with such an inorganic acid and/or an organic acid, and may further form a complex with the alkylene glycol.

When the basic crosslinking accelerator is compounded in the crosslinkable rubber composition according to the present invention, it is compounded in an amount of preferably 0.1 to 20 parts by weight, more preferably 0.2 to 15 parts by weight, and further preferably 0.5 to 10 parts by weight relative to 100 parts by weight of the carboxyl group-containing nitrile rubber.

Moreover, in the crosslinkable rubber composition according to the present invention, other compounding agents usually used in the rubber processing field may be compounded. Examples of such compounding agents include, for example, reinforcing agents, fillers, photostabilizers, scorch retarders, plasticizing agents, processing aids, glidants, tackifiers, lubricating agents, flame retardants, acid acceptors, antifungal agents, antistatic agents, coloring agents, silane coupling agents, crosslinking aids, co-crosslinking agents, crosslinking accelerators, crosslinking retardants and foaming agents. For an amount in which these compounding agents are compounded, it is possible to appropriately select an amount depending on the purpose of compounding.

The plasticizing agent is not particularly limited, but trimellitic acid-based plasticizing agents, ether ester-based plasticizing agents or the like can be used. Specific examples thereof include tri-2-ethylhexyl trimellitate, isononyl trimellitate ester, bis[2-(2-butoxyethoxy)ethyl] adipate, diheptanoate, di-2-ethylhexanoate, didecanoate and the like. One of these plasticizing agents may be used singly, or two or more of them may be used in combination.

Furthermore, a rubber other than the above-mentioned carboxyl group-containing nitrile rubber may be compounded in the crosslinkable rubber composition according to the present invention as long as it does not hinder effects of the present invention.

Examples of such a rubber include acrylic rubbers, ethylene-acrylic acid copolymer rubbers, fluororubbers, styrene-butadiene copolymer rubbers, polybutadiene rubbers, ethylene-propylene copolymer rubbers, ethylene-propylene-diene terpolymer rubbers, epichlorohydrin rubbers, urethane rubbers, chloroprene rubbers, silicone rubbers, fluorosilicone rubbers, chlorosulfonated polyethylene rubbers, natural rubbers, polyisoprene rubbers and the like.

When the rubber other than the carboxyl group-containing nitrile rubber is compounded in the crosslinkable rubber composition, it is compounded in an amount of preferably 30 parts by weight or less, more preferably 20 parts by weight or less, and further preferably 10 parts by weight or less relative to 100 parts by weight of the carboxyl group-containing nitrile rubber.

Furthermore, the crosslinkable rubber composition according to the present invention is prepared by mixing the above-described components preferably in a non-aqueous system. A method of preparing the crosslinkable rubber composition according to the present invention is not limited, but it can be prepared usually by subjecting components excluding the crosslinking agent, the co-crosslinking agent, which is unstable to heat, and the like to a primary kneading with a mixer such as a Banbury mixer, an intermixer or a kneader, and subsequently transferring them to an open roll or the like, adding the crosslinking agent, the crosslinking accelerator, which is unstable to heat, and the like thereto, and subjecting them to a secondary kneading. Note that the primary kneading is usually carried out at a temperature of 10 to 200° C., preferably 30 to 180° C. for 1 minute to 1 hour, preferably 1 minute to 30 minutes, and the secondary kneading is usually carried out at a temperature of 10 to 90° C., preferably 20 to 60° C. for 1 minute to 1 hour, preferably 1 minute to 30 minutes.

<Crosslinked Rubber Product>

A crosslinked rubber product according to the present invention is formed by crosslinking the above-mentioned crosslinkable rubber composition according to the present invention.

The crosslinked rubber product according to the present invention can be produced by: using the crosslinkable rubber composition according to the present invention; molding it with a molding machine suited for a desired shape, such as an extruder, an injection molding machine, a compressor or a roll; heating it to cause crosslinking reaction; and fixing its shape as a crosslinked product. In this case, crosslinking may be carried out after molding, or may be carried out simultaneously with molding. The molding temperature is usually 10 to 200° C., preferably 25 to 120° C. The crosslinking temperature is usually 100 to 200° C., preferably 130 to 190° C., while the crosslinking time is usually 1 minute to 24 hours, preferably 2 minutes to 1 hour.

Furthermore, depending on the shape, size and the like of the crosslinked product, there are some cases where its inside has not been crosslinked sufficiently even if its surface has been crosslinked. Therefore, the crosslinked product may be further heated to carry out a secondary crosslinking. When the secondary crosslinking is carried out, the temperature is usually 10 to 200° C., preferably 25 to 120° C. The crosslinking time therefor is usually 1 minute to 24 hours, preferably 2 minutes to 10 hours.

For the heating method, general methods used for crosslinking a rubber, such as press heating, steam heating, oven heating and hot air heating may be selected appropriately.

The crosslinked rubber product according to the present invention, obtained as such, is obtained by crosslinking a crosslinkable rubber composition containing a carboxyl group-containing nitrile rubber to be obtained through the above-mentioned production method according to the present invention, and has excellent water resistance and permanent compression set resistance.

Due to this, utilizing such characteristics, the crosslinked rubber product according to the present invention can be used for a wide variety of applications, such as various sealing materials such as O-rings, packings, diaphragms, oil seals, shaft seals, bearing seals, well head seals, shock absorber seals, coolant seals or oil coolant seals, which are seals for sealing up a coolant such as a long life coolant (LLC), air compressor seals, seals for sealing up freon or fluorohydrocarbon, or carbon dioxide, which is used for compressors for cooling devices for air conditioners or refrigerating machines of air-conditioning systems, seals for sealing up supercritical carbon dioxide or subcritical carbon dioxide, which is used as a washing medium in precision washing, seals for rolling devices (roller bearings, automotive hub units, automotive water pumps, linear guide devices, ball screws and the like), valves and valve seats, BOPs (blow out preventers), and platters; various gaskets such as intake manifold gaskets, which are attached at connecting parts between intake manifolds and cylinder heads, cylinder head gaskets, which are attached at connecting parts between cylinder blocks and cylinder heads, rocker cover gaskets, which are attached at connecting parts between rocker covers and cylinder heads, oil pan gaskets, which are attached at connecting parts between oil pans and cylinder blocks or transmission cases, gaskets for fuel cell separator use, which are attached between a pair of housings sandwiching unit cells provided with positive electrodes, electrolyte plates and negative electrodes, and gaskets for top covers of hard disk drives; various rolls such as rolls for printing, rolls for ironmaking, rolls for papermaking, industrial rolls and rolls for office equipment; various belts such as flat belts (film core flat belts, cord flat belts, laminated flat belts, single type flat belts and the like), V-belts (wrapped V-belts, low edge V-belts and the like), V-ribbed belts (single V-ribbed belts, double V-ribbed belts, wrapped V-ribbed belt, rubber-backed V-ribbed belts, top cog V-ribbed belts and the like), belts for CVT, timing belts, toothed belts, and conveyor belts; various hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; various boots such as CVJ boots, propeller shaft boots, constant velocity joint boots, and rack and pinion boots; attenuating material rubber parts such as cushion materials, dynamic dampers, rubber couplings, air springs, vibration absorbers, and clutch facing materials; and dust covers, automotive interior members, friction materials, tires, covered cables, shoe soles, electromagnetic wave shields, adhesives including adhesives for flexible printed circuits boards, and fuel cell separators, as well as the electronics field. Among these, the crosslinked rubber product according to the present invention is particularly suitable for an application as a sealing material for sealing up an aqueous refrigerant because it has excellent water resistance and permanent compression set resistance.

EXAMPLES

Hereinafter, the present invention will be described in further detail based on Examples, but the present invention is not limited thereto. Note that, hereinafter, a "part(s)" is on the basis of weight unless otherwise indicated. Furthermore, tests and evaluations were performed as follows.

[Composition of Carboxyl Group-Containing Nitrile Rubber]

The content ratio for each of the monomer units constituting a carboxyl group-containing nitrile rubber was measured through the following methods.

That is, the content ratio of mono-n-butyl maleate units was calculated by: adding 100 ml of 2-butanone to 0.2 g of the 2 mm square-sized carboxyl group-containing nitrile rubber and stirring the resultant for 4 hours; then adding 20 ml of ethanol and 10 ml of water; while stirring the resultant, using a 0.02 N hydrous ethanol solution of potassium hydroxide for titration with thymolphthalein as an indicator at room temperature to thereby determine the molar number of carboxyl groups to 100 g of the carboxyl group-containing nitrile rubber; and converting the obtained molar number to the amount of mono-n-butyl maleate units.

The content ratio of acrylonitrile units was calculated by measuring the content of nitrogen in the carboxyl group-containing nitrile rubber through the Kjeldahl method in accordance with JIS K6384.

The content ratios of 1,3-butadiene units and saturated butadiene units were calculated as the remaining components out of the above-described monomer units.

In the case of carboxyl group-containing nitrile rubbers (a-11) and (a-12), first of all, the content ratios of 1,3-butadiene units and saturated butadiene units were calculated by measuring the iodine values before and after hydrogenating reaction (in accordance with JIS K6235).

Subsequently, the content ratio of n-butyl acrylate units was determined through calculation from the content ratios of mono-n-butyl maleate units, 1,3-butadiene units, saturated butadiene units and acrylonitrile units determined as described above.

[Iodine Value]

The iodine value of the carboxyl group-containing nitrile rubber was measured in accordance with JIS K6235.

[Content of Metals in Carboxyl Group-Containing Nitrile Rubber]

The content of metals in the carboxyl group-containing nitrile rubber was measured by: adding sulfuric acid and nitric acid to the carboxyl group-containing nitrile rubber and heating the resultant for wet degradation; and then appropriately diluting it and using internal standard calibration curve method with ICP-AES (SPS-5000; manufactured by Seiko Instruments Inc.) Note that, in the present Examples, the content of all detectable metals (the content of all metals) and the content of metals with a valence of two or more (the content of divalent or higher metals) were measured.

[Water Resistance]

A crosslinkable rubber composition was placed in a mold with the length of 15 cm, the width of 15 cm and the depth of 0.2 cm, press-molded by applying a pressing pressure of 10 MPa at 170° C. for 20 minutes, and then subjected to a secondary crosslinking at 170° C. for 4 hours to obtain a sheet-shaped crosslinked rubber product. Then, the obtained sheet-shaped crosslinked rubber product was immersed in a solution of a long life coolant (LLC) with a temperature of 80° C. for 168 hours. Subsequently, the degree of swelling after the immersion in the LLC solution was determined according to the formula described below. It can be said that the lower the swelling rate after the immersion in the LLC solution is, the more excellent the water resistance, and furthermore, the LLC resistance are.

Degree of Swelling After Immersion in LLC Solution (%)=(Weight of Crosslinked Rubber Product After Immersion in LLC Solution−Weight of Crosslinked Rubber Product Before Immersion in LLC Solution)/Weight of Crosslinked Rubber Product Before Immersion in LLC Solution×100

[Permanent Compression Set (O-Ring Permanent Compression Set)]

An O-ring-shaped test piece was obtained by crosslinking a crosslinkable rubber composition at 170° C. and a pressing pressure of 10 MPa for 20 minutes, using a mold with an inner diameter of 30 mm and a ring diameter of 3 mm, and then subjecting the resultant to a secondary crosslinking at 170° C. for 4 hours. Then, using the obtained O-ring-shaped test piece, the permanent compression set was measured under conditions where the O-ring-shaped test piece was sandwiched between two planes with the distance therebetween being compressed by 25% in the thickness direction of the ring, and retained in such a state at 150° C. for 168 hours in accordance with JIS K6262. The smaller this value is, the more excellent the permanent compression set resistance is.

[Average Crumb Diameter]

After water washing and retrieval, a crumb-like rubber was classified with a classifying sieve. Subsequently, the rubber was subjected to vacuum drying at 60° C. for 12 hours, and after the drying, the weight of the dried crumb was measured to determine the weight average particle diameter, which was defined as the average crumb diameter.

Synthetic Example 1

(Production of Carboxyl Group-Containing Nitrile Rubber Latex)

To a metallic bottle, 180 parts of ion exchanged water; 25 parts of an aqueous solution of sodium dodecylbenzenesulfonate at a concentration of 10% by weight; 5 parts of a sodium salt of a condensate of naphthalenesulfonic acid and formalin at a concentration of 10%; 37 parts of acrylonitrile; 4 parts of mono-n-butyl maleate; and 0.5 parts of t-dodecyl mercaptan (molecular weight modifier) were charged in this order. The inside gas was replaced with nitrogen three times, and then, 59 parts of 1,3-butadiene was charged. The metallic bottle was maintained at 5° C., and 0.1 parts of cumen hydroperoxide (polymerization initiator), a reducing agent, a chelating agent and a builder were charged. While rotating the metallic bottle, polymerization reaction was carried out for 16 hours. Subsequently, 0.1 parts of an aqueous solution of hydroquinone (polymerization terminator) at a concentration of 10% by weight were added to stop the polymerization reaction, and then, a rotary evaporator was used to remove the residual monomers at a water temperature of 60° C. to obtain a copolymer rubber latex (solid content concentration of about 30% by weight).

Next, in order to make the content of palladium relative to the dry weight of the rubber contained in the latex obtained as described above 1000 ppm by weight, into an autoclave, the latex obtained as described above and a palladium catalyst (a solution famed by mixing an acetone solution of palladium acetate at a concentration of 1% by weight and the equal weight of ion exchanged water) were added, and hydrogenating reaction was carried out at a hydrogen pressure of 3 MPa and a temperature of 50° C. for 6 hours. Then, 0.1 parts of 4,6-bis(octylthiomethyl)-o-cresol (Irganox 1520L, manufactured by BASF Japan Ltd., anti-aging agent) and 0.3 parts of ACTICIDE MBS (manufactured by THOR JAPAN, antiseptic agent) were added relative to 100 parts of the polymer in the latex. To this, an aqueous solution of sulfuric acid was added in an appropriate amount, thereby obtaining a carboxyl group-containing nitrile rubber latex (solid content concentration: 12.5% by weight).

Example 1

(Coagulation of Carboxyl Group-Containing Nitrile Rubber Latex)

To a mixing vessel provided with a stirrer, 1200 parts of water, 5 parts of sodium chloride (monovalent metal salt), and 0.3 parts of a dimethylamine-ammonia-epichlorohydrin polycondensate (product name "PAPYOGEN P-271," manufactured by SENKA corporation, weight average molecular weight (Mw): 2,000 to 3,000, cationic polymer flocculating agent) were added, and after stirring, the temperature of the mixture was elevated to 80° C. Next, to the mixing vessel, 800 parts of the carboxyl group-containing nitrile rubber latex obtained in Synthetic Example 1 (100 parts in terms of the carboxyl group-containing nitrile rubber) were added, and after completing the addition, by maintaining the temperature at 80° C. or higher and stirring the resultant mixture for 3 minutes, the carboxyl group-containing nitrile rubber was coagulated to obtain a crumb slurry containing a crumb-like carboxyl group-containing nitrile rubber.

Next, 100 parts of the crumb slurry obtained as described above was subjected to water washing using 1900 parts of water once, and the water-containing crumb after the water washing was subjected to water washing once and to filtration. Subsequently, the crumb was vacuum-dried at 60° C. for 12 hours, thereby obtaining carboxyl group-containing nitrile rubber (a-1).

The composition of the obtained carboxyl group-containing nitrile rubber (a-1) was as follows: 34% by weight of acrylonitrile units, 62.5% by weight of butadiene units (including those hydrogenated), and 3.5% by weight of mono-n-butyl maleate units. The iodine value thereof was 15. Furthermore, the content of all metals of the obtained carboxyl group-containing nitrile rubber (a-1) was 400 ppm by weight, and the content of divalent or higher metals was 10 ppm by weight.

Alternatively, sufficiently dried carboxyl group-containing nitrile rubber (a-1) could be obtained by carrying out heating and drying at 100° C. for 1 hour, using a drier with a ventilation function, instead of the vacuum drying.

(Preparation of Crosslinkable Rubber Composition)

To 100 parts of the obtained carboxyl group-containing nitrile rubber (a-1), 40 parts of FEF carbon black (product name "Seast SO," manufactured by Tokai Carbon Co., Ltd.), 5 parts of tri-2-ethylhexyl trimellitate (product name "ADK CIZER C-8," manufactured by ADEKA CORPORATION, plasticizing agent), 1.5 parts of 4,4'-di-(α,α-dimethylbenzyl) diphenylamine (product name "NOCRAC CD," manufactured by OUCHI SHINKO CHEMICAL INDUSTRIAL CO., LTD., anti-aging agent), 1 part of stearic acid, and 1 part of a polyoxyethylene alkyl ether phosphate ester (product name "PHOSPHANOL. RL-210," manufactured by TOHO Chemical Industry Co., Ltd., processing aid) were added, and the resultant mixture was mixed at 50° C. for 5 minutes using a Banbury mixer. Next, the obtained mixture was transferred to a roll at 50° C., and 2.4 parts of hexamethylenediamine carbamate (manufactured by DUPONT DOW ELASTOMERS, product name "Diak #1," polyamine crosslinking agent, which belongs to aliphatic polyvalent amines) and 4 parts of 1,8-diazabicyclo[5.4.0]-undecene-7 (DBU) (product name "RHENOGRAN XLA-60 (GE2014)," manufactured by Rhein Chemie Corporation, DBU 60% (including parts that become a zinc dialkyldiphosphate salt), basic crosslinking accelerator) were compounded thereto. By kneading the resultant mixture, a crosslinkable rubber composition was obtained.

Then, using the obtained crosslinkable rubber composition, measurements of water resistance and permanent compression set (O-ring permanent compression set) were carried out according to the above-mentioned methods. Results are shown in Table 1.

Example 2

Carboxyl group-containing nitrile rubber (a-2) was obtained in the same manner as in Example 1 except that the amount of sodium chloride used was changed from 5 parts to 10 parts and the amount of the dimethylamine-ammonia-epichlorohydrin polycondensate used was changed from 0.3 parts to 0.2 parts upon subjecting the carboxyl group-containing nitrile rubber latex to coagulation. The content of all metals and the content of divalent or higher metals of the obtained carboxyl group-containing nitrile rubber (a-2) were as shown in Table 1.

Then, a crosslinkable rubber composition was prepared in the same manner as in Example 1 except that the carboxyl group-containing nitrile rubber (a-2) obtained as described above was used instead of carboxyl group-containing nitrile rubber (a-1), and evaluations were similarly carried out. Results are shown in Table 1.

Alternatively, sufficiently dried carboxyl group-containing nitrile rubber (a-2) could be obtained by carrying out heating and drying at 100° C. for 1 hour, using a drier with a ventilation function, instead of the vacuum drying.

Example 3

Carboxyl group-containing nitrile rubber (a-3) was obtained in the same manner as in Example 1 except that the amount of sodium chloride used was changed from 5 parts to 15 parts and the amount of the dimethylamine-ammonia-epichlorohydrin polycondensate used was changed from 0.3 parts to 0.1 parts upon subjecting the carboxyl group-containing nitrile rubber latex to coagulation. The content of all metals and the content of divalent or higher metals of the obtained carboxyl group-containing nitrile rubber (a-3) were as shown in Table 1.

Then, a crosslinkable rubber composition was prepared in the same manner as in Example 1 except that the carboxyl group-containing nitrile rubber (a-3) obtained as described above was used instead of carboxyl group-containing nitrile rubber (a-1), and evaluations were similarly carried out. Results are shown in Table 1.

Alternatively, sufficiently dried carboxyl group-containing nitrile rubber (a-3) could be obtained by carrying out heating and drying at 100° C. for 1 hour, using a drier with a ventilation function, instead of the vacuum drying.

Example 4

Carboxyl group-containing nitrile rubber (a-4) was obtained in the same manner as in Example 1 except that 0.4 parts of a dimethylamine-ammonia-epichlorohydrin polycondensate (product name "UNISENCE KHE 100L," manufactured by SENKA corporation, weight average molecular weight (Mw): 10,000 to 100,000, cationic polymer flocculating agent) was used instead of 0.3 parts of the dimethylamine-ammonia-epichlorohydrin polycondensate (product name "PAPYOGEN P-271") upon subjecting the carboxyl group-containing nitrile rubber latex to coagulation. The content of all metals and the content of divalent or higher metals of the obtained carboxyl group-containing nitrile rubber (a-4) were as shown in Table 1.

Then, a crosslinkable rubber composition was prepared in the same manner as in Example 1 except that the carboxyl group-containing nitrile rubber (a-4) obtained as described above was used instead of carboxyl group-containing nitrile rubber (a-1), and evaluations were similarly carried out. Results are shown in Table 1.

Alternatively, sufficiently dried carboxyl group-containing nitrile rubber (a-4) could be obtained by carrying out heating and drying at 100° C. for 1 hour, using a drier with a ventilation function, instead of the vacuum drying.

Example 5

Carboxyl group-containing nitrile rubber (a-5) was obtained in the same manner as in Example 1 except that 0.5 parts of a dimethyldiallylammonium chloride polymer (product name "UNISENCE FPA 100L," manufactured by SENKA corporation, weight average molecular weight (Mw): 10,000 to 100,000, cationic polymer flocculating agent) was used instead of 0.3 parts of the dimethylamine-ammonia-epichlorohydrin polycondensate (product name "PAPYOGEN P-271") upon subjecting the carboxyl group-containing nitrile rubber latex to coagulation. The content of all metals and the content of divalent or higher metals of the obtained carboxyl group-containing nitrile rubber (a-5) were as shown in Table 1.

Then, a crosslinkable rubber composition was prepared in the same manner as in Example 1 except that the carboxyl group-containing nitrile rubber (a-5) obtained as described above was used instead of carboxyl group-containing nitrile rubber (a-1), and evaluations were similarly carried out. Results are shown in Table 1.

Alternatively, sufficiently dried carboxyl group-containing nitrile rubber (a-5) could be obtained by carrying out heating and drying at 100° C. for 1 hour, using a drier with a ventilation function, instead of the vacuum drying.

Comparative Example 1

When coagulation operations were carried out in the same manner as in Example 1 except that the amount of sodium chloride used was changed from 5 parts to 15 parts and the dimethylamine-ammonia-epichlorohydrin polycondensate was not used upon subjecting the carboxyl group-containing nitrile rubber latex to coagulation, coagulation did not advance, and therefore, no coagulated product was obtained.

Comparative Example 2

Carboxyl group-containing nitrile rubber (a-6) was obtained in the same manner as in Example 1 except that the amount of sodium chloride used was changed from 5 parts to 75 parts and the dimethylamine-ammonia-epichlorohydrin polycondensate was not used upon subjecting the carboxyl group-containing nitrile rubber latex to coagulation. The content of all metals and the content of divalent or higher metals of the obtained carboxyl group-containing nitrile rubber (a-6) were as shown in Table 1. Note that, the reason why the amount of sodium chloride used in Comparative Example 2 was 75 parts was because compounding of 75 parts was required to allow satisfactory advance of coagulation.

Then, a crosslinkable rubber composition was prepared in the same manner as in Example 1 except that the carboxyl group-containing nitrile rubber (a-6) obtained as described above was used instead of carboxyl group-containing nitrile rubber (a-1), and evaluations were similarly carried out. Results are shown in Table 1.

Comparative Example 3

Carboxyl group-containing nitrile rubber (a-7) was obtained in the same manner as in Example 1 except that 5 parts of calcium chloride was used instead of 5 parts of sodium chloride and the dimethylamine-ammonia-epichlorohydrin polycondensate was not used upon subjecting the carboxyl group-containing nitrile rubber latex to coagulation. The content of all metals and the content of divalent or higher metals of the obtained carboxyl group-containing nitrile rubber (a-7) were as shown in Table 1. Note that, the reason why the amount of calcium chloride used in Comparative Example 3 was 5 parts was because compounding of 5 parts was required to allow satisfactory advance of coagulation.

Then, a crosslinkable rubber composition was prepared in the same manner as in Example 1 except that the carboxyl group-containing nitrile rubber (a-7) obtained as described above was used instead of carboxyl group-containing nitrile rubber (a-1), and evaluations were similarly carried out. Results are shown in Table 1.

Comparative Example 4

Carboxyl group-containing nitrile rubber (a-8) was obtained in the same manner as in Example 1 except that sodium chloride was not used and the amount of the dimethylamine-ammonia-epichlorohydrin polycondensate used was changed from 0.3 parts to 5 parts upon subjecting the carboxyl group-containing nitrile rubber latex to coagulation. The content of all metals and the content of divalent or higher metals of the obtained carboxyl group-containing nitrile rubber (a-8) were as shown in Table 1.

Then, a crosslinkable rubber composition was prepared in the same manner as in Example 1 except that the carboxyl group-containing nitrile rubber (a-8) obtained as described above was used instead of carboxyl group-containing nitrile rubber (a-1), and evaluations were similarly carried out. Results are shown in Table 1.

Comparative Example 5

Carboxyl group-containing nitrile rubber (a-9) was obtained in the same manner as in Example 1 except that the amount of sodium chloride used was changed from 5 parts to 15 parts and the amount of the dimethylamine-ammonia-epichlorohydrin polycondensate used was changed from 0.3 parts to 5 parts upon subjecting the carboxyl group-containing nitrile rubber latex to coagulation. The content of all metals and the content of divalent or higher metals of the obtained carboxyl group-containing nitrile rubber (a-9) were as shown in Table 1.

Then, a crosslinkable rubber composition was prepared in the same manner as in Example 1 except that the carboxyl group-containing nitrile rubber (a-9) obtained as described above was used instead of carboxyl group-containing nitrile rubber (a-1), and evaluations were similarly carried out. Results are shown in Table 1.

Comparative Example 6

Carboxyl group-containing nitrile rubber (a-10) was obtained in the same manner as in Example 1 except that the amount of sodium chloride used was changed from 5 parts to 40 parts and the amount of the dimethylamine-ammonia-epichlorohydrin polycondensate used was changed from 0.3 parts to 0.5 parts upon subjecting the carboxyl group-containing nitrile rubber latex to coagulation. The content of all metals and the content of divalent or higher metals of the obtained carboxyl group-containing nitrile rubber (a-10) were as shown in Table 1.

Then, a crosslinkable rubber composition was prepared in the same manner as in Example 1 except that the carboxyl group-containing nitrile rubber (a-10) obtained as described above was used instead of carboxyl group-containing nitrile rubber (a-1), and evaluations were similarly carried out. Results are shown in Table 1.

Synthetic Example 2

(Production of Carboxyl Group-Containing Nitrile Rubber Latex)

To a metallic bottle, 180 parts of ion exchanged water; 25 parts of an aqueous solution of sodium dodecylbenzenesulfonate at a concentration of 10% by weight; 5 parts of a sodium salt of a condensate of naphthalenesulfonic acid and formalin at a concentration of 10%; 20 parts of acrylonitrile; 5 parts of mono-n-butyl maleate; 35 parts of n-butyl acrylate; and 0.5 parts of t-dodecyl mercaptan (molecular weight modifier) were charged in this order. The inside gas was replaced with nitrogen three times, and then, 40 parts of 1,3-butadiene was charged. The metallic bottle was maintained at 5° C., and 0.1 parts of cumen hydroperoxide (polymerization initiator), a reducing agent, a chelating agent and a builder were charged. While rotating the metallic bottle, polymerization reaction was carried out for 16 hours. Subsequently, 0.1 parts of an aqueous solution of hydroquinone (polymerization terminator) at a concentration of 10% by weight were added to stop the polymerization reaction, and then, a rotary evaporator was used to remove the residual monomers at a water temperature of 60° C. to obtain a copolymer rubber latex (solid content concentration of about 30% by weight).

Next, in order to make the content of palladium relative to the dry weight of the rubber contained in the latex obtained as described above 1000 ppm by weight, into an autoclave, the latex obtained as described above and a palladium catalyst (a solution famed by mixing an acetone solution of palladium acetate at a concentration of 1% by weight and the equal weight of ion exchanged water) were added, and hydrogenating reaction was carried out at a hydrogen pressure of 3 MPa and a temperature of 50° C. for 6 hours. Then, 0.1 parts of 4,6-bis(octylthiomethyl)-o-cresol (Irganox 1520L, manufactured by BASF Japan Ltd., anti-aging agent) and 0.3 parts of ACTICIDE MBS (manufactured by THOR JAPAN, antiseptic agent) were added relative to 100 parts of the polymer in the latex. To this, an aqueous solution of sulfuric acid was added in an appropriate amount, thereby obtaining a carboxyl group-containing nitrile rubber latex (solid content concentration: 12.5% by weight).

Example 6

(Coagulation of Carboxyl Group-Containing Nitrile Rubber Latex)

To a mixing vessel provided with a stirrer, 1200 parts of water, 10 parts of sodium chloride (monovalent metal salt), and 0.2 parts of a dimethylamine-ammonia-epichlorohydrin polycondensate (product name "PAPYOGEN P-271," manufactured by SENKA corporation, weight average molecular weight (Mw): 2,000 to 3,000, cationic polymer flocculating agent) were added, and after stirring, the temperature of the mixture was elevated to 80° C. Next, to the mixing vessel, 800 parts of the carboxyl group-containing nitrile rubber latex obtained in Synthetic Example 2 (100 parts in terms of the carboxyl group-containing nitrile rubber) were added, and after completing the addition, by maintaining the temperature at 80° C. or higher and stirring the resultant mixture for 3 minutes, the carboxyl group-containing nitrile rubber was coagulated to obtain a crumb slurry containing a crumb-like carboxyl group-containing nitrile rubber.

Next, 100 parts of the crumb slurry obtained as described above were subjected to water washing using 1900 parts of water once, and the water-containing crumb after the water washing was subjected to water washing once and to filtration. Subsequently, the crumb was vacuum-dried at 60° C. for 12 hours, thereby obtaining carboxyl group-containing nitrile rubber (a-11).

The composition of the obtained carboxyl group-containing nitrile rubber (a-11) was as follows: 20% by weight of acrylonitrile units, 46.5% by weight of butadiene units (including those hydrogenated), 30% by weight of n-butyl acrylate units, and 3.5% by weight of mono-n-butyl maleate units. The iodine value thereof was 13. Furthermore, the content of all metals of the obtained carboxyl group-containing nitrile rubber (a-11) was 630 ppm by weight, and the content of divalent or higher metals was 12 ppm by weight.

Alternatively, sufficiently dried carboxyl group-containing nitrile rubber (a-11) could be obtained by carrying out heating and drying at 100° C. for 1 hour, using a drier with a ventilation function, instead of the vacuum drying.

(Preparation of Crosslinkable Rubber Composition)

Then, a crosslinkable rubber composition was prepared in the same manner as in Example 1 except that the carboxyl group-containing nitrile rubber (a-11) obtained as described above was used instead of carboxyl group-containing nitrile rubber (a-1), and evaluations were similarly carried out. Results are shown in Table 1.

Synthetic Example 3

(Production of Carboxyl Group-Containing Nitrile Rubber Latex)

A carboxyl group-containing nitrile rubber latex (solid content concentration: 12.5% by weight) was obtained in the same manner as in Synthetic Example 2 except that the amount of acrylonitrile charged was changed to 15 parts and the amount of n-butyl acrylate charged was changed to 40 parts.

Example 7

(Coagulation of Carboxyl Group-Containing Nitrile Rubber Latex)

Carboxyl group-containing nitrile rubber (a-12) was obtained in the same manner as in Example 6 except that the carboxyl group-containing nitrile rubber latex obtained in Synthetic Example 3 was used instead of the carboxyl group-containing nitrile rubber latex obtained in Synthetic Example 2.

The composition of the obtained carboxyl group-containing nitrile rubber (a-12) was as follows: 15% by weight of acrylonitrile units, 46.5% by weight of butadiene units (including those hydrogenated), 35% by weight of n-butyl acrylate units, and 3.5% by weight of mono-n-butyl maleate units. The iodine value thereof was 13. Furthermore, the content of all metals of the obtained carboxyl group-containing nitrile rubber (a-12) was 650 ppm by weight, and the content of divalent or higher metals was 11 ppm by weight.

Alternatively, sufficiently dried carboxyl group-containing nitrile rubber (a-12) could be obtained by carrying out heating and drying at 100° C. for 1 hour, using a drier with a ventilation function, instead of the vacuum drying.

(Preparation of Crosslinkable Rubber Composition)

Then, a crosslinkable rubber composition was prepared in the same manner as in Example 1 except that the carboxyl group-containing nitrile rubber (a-12) obtained as described above was used instead of carboxyl group-containing nitrile rubber (a-1), and evaluations were similarly carried out. Results are shown in Table 1.

TABLE 1

| | | Examples | | | | | | | Comparative Examples | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| Coagulating agents used upon coagulation | | | | | | | | | | | | | | |
| Sodium chloride | (Parts) | 5 | 10 | 15 | 5 | 5 | 10 | 10 | 15 | 75 | — | — | 15 | 40 |
| Calcium chloride | (Parts) | — | — | — | — | — | — | — | — | — | 5 | — | — | — |
| Dimethylamine-ammonia-epichlorohydrin polycondensate (weight average molecular weight: 2,000 to 3,000) | (Parts) | 0.3 | 0.2 | 0.1 | — | — | 0.2 | 0.2 | — | — | — | 5 | 5 | 0.5 |
| Dimethylamine-ammonia-epichlorohydrin polycondensate (weight average molecular weight: 10,000 to 100,000) | (Parts) | — | — | — | 0.4 | — | — | — | — | — | — | — | — | — |
| Dimethyldiallylammonium chloride polymer (weight average molecular weight: 10,000 to 100,000) | (Parts) | — | — | — | — | 0.5 | — | — | — | — | — | — | — | — |
| "Monovalent metal salt/polymer flocculating agent" | (Weight ratio) | 16.7 | 50 | 150 | 12.5 | 10 | 50 | 50 | — | — | — | — | 3 | 80 |
| Content of metals in carboxyl group-containing nitrile rubber | | | | | | | | | | | | | | |
| Content of all metals | (ppm by weight) | 400 | 600 | 750 | 750 | 750 | 630 | 650 | Uncoagulated | 1100 | 510 | 20 | 410 | 1200 |
| Content of divalent or higher metals | (ppm by weight) | 10 | 10 | 10 | 10 | 10 | 12 | 11 | | 10 | 500 | 10 | 12 | 13 |
| Evaluation of rubber | | | | | | | | | | | | | | |
| Average crumb diameter | (mm) | 4 | 5 | 7 | 4 | 4 | 4 | 4 | Uncoagulated | 15 | 11 | 3 | 4 | 8 |
| Evaluation of crosslinked rubber product | | | | | | | | | | | | | | |
| Degree of swelling upon immersion in LLC (water resistance, LLC resistance) | (%) | 4 | 5 | 6 | 5 | 6 | 6 | 6 | Uncoagulated | 11 | 4.5 | 7 | 11 | 13 |
| Permanent compression set (O-ring permanent compression set) | (%) | 48 | 47 | 47 | 48 | 49 | 48 | 47 | | 47 | 57 | 55 | 57 | 54 |

In Table 1, the amounts of metal salts (that is, sodium chloride and calcium chloride) and polymer flocculating agents (that is, dimethylamine-ammonia-epichlorohydrin polycondensates and the dimethyldiallylammonium chloride polymer) used are shown relative to 100 parts of the carboxyl group-containing nitrile rubber in the carboxyl group-containing nitrile rubber latex.

As shown in Table 1, carboxyl group-containing nitrile rubbers that were obtained by mixing a monovalent metal salt and a polymer flocculating agent into a carboxyl group-containing nitrile rubber latex to carry out coagulation, wherein the monovalent metal salt was compounded in an amount of 3 to 25 parts by weight and the polymer flocculating agent was compounded in an amount of 0.01 to 10 parts by weight relative to 100 parts by weight of a rubber solid content in the latex, and a weight ratio of the monovalent metal salt/the polymer flocculating agent was in the range of 10 to 500, were able to provide crosslinked rubber products excellent in water resistance and permanent compression set resistance (Examples 1 to 7).

On the other hand, when only the monovalent metal salt was used as the coagulating agent, if it was compounded in a too small amount, it was not possible to carry out coagulation (Comparative Example 1), and if the amount thereof to be compounded was increased to achieve satisfactory coagulation, the obtained crosslinked rubber product had poor water resistance (Comparative Example 2).

In addition, when calcium chloride, which is a divalent metal salt, was used or when only the polymer flocculating agent was used as the coagulating agent, the obtained crosslinked rubber products had poor permanent compression set resistance (Comparative Examples 3 and 4).

Furthermore, even when the monovalent metal salt and the polymer flocculating agent were used as the coagulating agents, if the weight ratio of the monovalent metal salt/the polymer flocculating agent was too small or if the monovalent metal salt was compounded in a too large amount, the obtained crosslinked rubber products had poor water resistance and permanent compression set resistance (Comparative Examples 5 and 6).

The invention claimed is:

1. A method of producing a carboxyl group-containing nitrile rubber, the method comprising a coagulation step of coagulating a carboxyl group-containing nitrile rubber component by mixing a monovalent metal salt and a polymer flocculating agent into a carboxyl group-containing nitrile rubber latex, wherein the monovalent metal salt is compounded in an amount of 3 to 25 parts by weight and the polymer flocculating agent is compounded in an amount of 0.01 to 10 parts by weight relative to 100 parts by weight of a rubber solid content in the latex, and a weight ratio of the monovalent metal salt/the polymer flocculating agent is in the range of 10 to 500.

2. The method of producing a carboxyl group-containing nitrile rubber according to claim 1, wherein the polymer flocculating agent is a cationic polymer flocculating agent.

3. The method of producing a carboxyl group-containing nitrile rubber according to claim 1, wherein the polymer flocculating agent is a condensate formed by co-condensating (A), (B) and/or (C) described below:
    (A) at least one selected from alkylamines and alkanolamines, or a mixture of at least one selected from alkylamines and alkanolamines with ammonia;
    (B) epihalohydrin; and
    (C) a compound represented by general formula (1) described below:

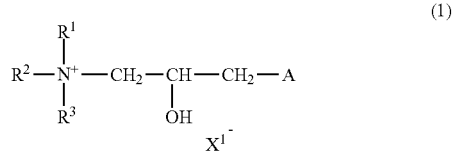

wherein $R^1$, $R^2$ and $R^3$ each independently denote a hydrogen atom, a lower alkyl group having 1 to 4 carbon atoms or a benzyl group, A denotes a halogen atom, and $X^{1-}$ denotes an arbitrary anion.

4. The method of producing a carboxyl group-containing nitrile rubber according to claim 1, wherein the carboxyl group-containing nitrile rubber contains an α, β-ethylenically unsaturated carboxylate ester monomer unit.

5. A method of producing a crosslinkable rubber composition, the method comprising a step of compounding a crosslinking agent to a carboxyl group-containing nitrile rubber obtained through the production method according to claim 1.

6. A method of producing a crosslinked rubber product, the method comprising a step of crosslinking a crosslinkable rubber composition obtained through the production method according to claim 5.

* * * * *